United States Patent [19]

Fujimura et al.

[11] Patent Number: 5,053,965
[45] Date of Patent: Oct. 1, 1991

[54] ATTITUDE CHANGE SUPPRESSIVE VEHICULAR HEIGHT REGULATION SYSTEM

[75] Inventors: Itaru Fujimura; Naoto Fukushima; Yukio Fukunaga; Yohsuke Akatsu; Masaharu Sato, all of Kanagawa, Japan

[73] Assignee: Nissan Motor Company, Limited, Kanagawa, Japan

[21] Appl. No.: 398,556

[22] Filed: Aug. 25, 1989

[30] Foreign Application Priority Data

Aug. 26, 1988 [JP] Japan .................. 63-211966

[51] Int. Cl.⁵ ............................. B60G 17/00
[52] U.S. Cl. ................... 364/424.05; 280/707
[58] Field of Search ............. 364/424.05, 424.01; 280/707; 180/79.1

[56] References Cited

U.S. PATENT DOCUMENTS

| | | | |
|---|---|---|---|
| 4,805,102 | 2/1989 | Ise et al. | 364/424.05 |
| 4,807,128 | 2/1989 | Ikemoto et al. | 364/424.05 |
| 4,821,191 | 4/1989 | Ikemoto et al. | 364/424.1 |
| 4,847,591 | 7/1989 | Ota et al. | 340/440 |
| 4,888,696 | 12/1989 | Akatsu et al. | 364/424.05 |
| 4,922,427 | 5/1990 | Yokote et al. | 364/424.05 |

FOREIGN PATENT DOCUMENTS

| | | |
|---|---|---|
| 0114757 | 1/1984 | European Pat. Off. |
| 0222329 | 6/1986 | European Pat. Off. |
| 0249246 | 6/1987 | European Pat. Off. |
| 32-172808 | 10/1957 | Japan |
| 33-8415 | 1/1958 | Japan |
| 35-85007 | 5/1960 | Japan |
| 58-126208(A) | 7/1983 | Japan |
| 62-234708 | 10/1987 | Japan |

Primary Examiner—Thomas G. Black
Attorney, Agent, or Firm—Lowe, Price, LeBlanc & Becker

[57] ABSTRACT

A vehicular height regulation system performs attitude change suppressive suspension control for equalized magnitude at respective of front and rear wheels. For performing equalized magnitude not only for the front suspension systems, the vehicular height control system includes a pair of actuator means associated with respective of rear-left and rear-right wheels, which actuator means are operable independently of each other.

25 Claims, 2 Drawing Sheets

ATTITUDE CHANGE SUPPRESSIVE VEHICULAR HEIGHT REGULATION SYSTEM

BACKGROUND OF THE INVENTION

1. Field of the Invention

The present invention relates generally to a vehicular height regulation system for regulating vehicular body height level relative to a road surface. More specifically, the invention relates to a vehicular height regulation system which has a capability of suppressing vehicular attitude change, such as rolling, pitching and lifting.

2. Description of the Background Art

In the recent days, various vehicular height regulation systems have been developed and proposed. Such vehicular height regulation systems have been known to be useful for improving riding comfort by avoiding substantial change of vehicular height or attitude, for preventing head lamp beam axis from offsetting from normal position, and for proving driving stability by adjusting vehicular height depending upon the vehicle traveling speed.

For example, Japanese Patent First (unexamined) Publication (Tokkai) Showa 57-172808, published on Oct. 23, 1982, and Japanese Patent First (unexamined) Publication (Tokkai) Showa 58-8415, published on Jan. 18, 1983 disclose typical and fundamental vehicular height control systems, in which vehicular height level is monitored at respective positions of vehicular body, for which suspension systems are provided.

On the other hand, Japanese Patent First (unexamined) Publication (Tokkai) Showa 60-85007 discloses pneumatic vehicular height regulation system which has a capability of suppressing attitude change of the vehicular body. In the disclosed system, front-left and front-right suspension systems are respectively provided variable pressure pneumatic springs connected to a pressurized air source via separately provided air supply network. On the other hand, rear-left and rear-right suspension systems have pneumatic springs connected to the pressurized air source via a common air supply network. Similarly type of vehicular height regulation system has been proposed in a co-pending U.S. patent application Ser. No. 135,110, filed on Dec. 18, 1987, assigned to common assignee to the present invention, counterpart German Patent Application has been published as German Patent First Publication No. 37 43 093.

Such prior proposed system takes a strategy of performing anti-rolling control utilizing front suspension systems and performing anti-pitching control utilizing front and rear suspension systems. Anti-rolling and anti-pitching control performed by the conventional vehicular height regulation system are successfully in suppression of vehicular attitude change in some extent. However, these controls are not at all complete and can cause degradation of drivability of the vehicle in certain condition. For example, when vehicular attitude change in rolling direction is cause due to destroy of load balance. In such case, anti-rolling control is performed only for front-left and front-right suspension system. This creates substantial difference in cornering force of the left and right suspension system to cause variation of steering characteristics.

SUMMARY OF THE INVENTION

Therefore, it is an object of the present invention to provide a vehicular height regulation system which can avoid variation of steering characteristics with maintaining vehicular height regulation performance at an equivalent level to that conventionally proposed.

In order to accomplish aforementioned and other objects, a vehicular height regulation system, according to the present invention, performs attitude change suppressive suspension control for equalized magnitude at respective of front and rear wheels. For performing equalized magnitude not only for the front suspension systems, the vehicular height control system includes a pair of actuator means associated with respective of rear-left and rear-right wheels, which actuator means are operable independently of each of other.

According to one aspect of the invention, a vehicular height regulation system comprises:

a first fluid actuator provided in a first suspension system disposed between a first side of a vehicular body and a first road wheel, the first actuator being variable of fluid pressure for adjusting relative distance between the first side of the vehicular body and the first road wheel a second fluid actuator provided in a second suspension system disposed between a second side of the vehicular body opposite to the first side and a second road wheel, the second fluid actuator being variable of fluid pressure for adjusting relative distance between the second side of the vehicular body and the second road wheel a fluid pressure source circuit connected to the first and second actuator, the fluid pressure source circuit incorporating a first valve means for adjusting fluid pressure in the first fluid actuator and a second valve means for adjusting fluid pressure in the second fluid actuator a sensor means for monitoring preselected parameter affected by vehicular attitude and variable depending upon magnitude and direction of vehicular body attitude change for producing an attitude change representative signal means for processing the attitude change representative signal for deriving a vehicular attitude change representative data a target attitude change magnitude setting means for setting a target attitude change magnitude and generating a reference data representative of the target attitude change magnitude means for comparing the vehicular attitude change representative data and the reference data for deriving a difference data therebetween and a controlling means, responsive to the difference data, for deriving first and second control signals which have opposite polarity to each other, for controlling the first and second valve means for reducing the difference between the vehicular attitude change representative data and the reference data to zero.

According to another aspect of the invention, an anti-rolling control system for a vehicular height regulation system comprises:

a first fluid actuator provided in a first suspension system disposed between a first side of a vehicular body and a first road wheel, the first actuator being variable of fluid pressure for adjusting relative distance between the first side of the vehicular body and the first road wheel a second fluid actuator provided in a second suspension system disposed between a second side of the vehicular body transversely oriented opposite to the first side and a second road wheel, the second fluid actuator being variable of fluid pressure for adjusting relative distance between the second side of the vehicular body and the second road wheel a fluid pressure source circuit connected to the first and second actuator, the fluid pressure source circuit incorporating a first valve means for adjusting fluid pressure in the first fluid actuator and a second valve means for adjusting fluid pressure in the second fluid actuator a sensor means for monitoring preselected parameter affected by vehicular attitude and variable depending upon magnitude and direction of vehicular body rolling for producing an rolling representative signal means for processing the rolling representative signal for deriving a vehicular rolling representative data a target rolling magnitude setting means for setting a target rolling magnitude and generating a reference data representative of the target rolling magnitude means for comparing the vehicular rolling representative data and the reference data for deriving a difference data therebetween and a controlling means, responsive to the difference data, for deriving first and second control signals which have opposite polarity to each other, for controlling the first and second valve means for reducing the difference between the vehicular rolling representative data and the reference data to zero.

According to a further aspect of the invention, an anti-pitching control system for a vehicular height regulation system comprises:

a first fluid actuator provided in a first suspension system disposed between a first side of a vehicular body and a first road wheel, the first actuator being variable of fluid pressure for adjusting relative distance between the first side of the vehicular body and the first road wheel a second fluid actuator provided in a second suspension system disposed between a second side of the vehicular body transversely oriented opposite to the first side and a second road wheel, the second fluid actuator being variable of fluid pressure for adjusting relative distance between the second side of the vehicular body and the second road wheel a fluid pressure source circuit connected to the first and second actuator, the fluid pressure source circuit incorporating a first valve means for adjusting fluid pressure in the first fluid actuator and a second valve means for adjusting fluid pressure in the second fluid actuator a sensor means for monitoring preselected parameter affected by vehicular attitude and variable depending upon magnitude and direction of vehicular body pitching for producing an pitching representative signal means for processing the pitching representative signal for deriving a vehicular pitching representative data a target pitching magnitude setting means for setting a target pitching magnitude and generating a reference data representative of the target pitching magnitude means for comparing the vehicular pitching representative data and the reference data for deriving a difference data therebetween and a controlling means, responsive to the difference data, for deriving first and second control signals which have opposite polarity to each other, for controlling the first and second valve means for reducing the difference between the vehicular pitching representative data and the reference data to zero.

According to a still further aspect of the invention, an attitude change suppressive vehicular height regulation system comprises:

a first actuator disposed in a first suspension system provided between front portion of a vehicular body and a first road wheel, the first actuator being variable of fluid pressure so as to adjust a relative distance between the vehicular body and the first road wheel a second actuator disposed in a second suspension system provided between front portion of a vehicular body and a second road wheel, the second actuator being variable of fluid pressure so as to adjust a relative distance between the vehicular body and the second road wheel a third actuator disposed in a third suspension system provided between rear portion of a vehicular body at the same transverse side to the first actuator and a third road wheel, the third actuator being variable of fluid pressure so as to adjust a relative distance between the vehicular body and the third road wheel a fourth actuator disposed in a fourth suspension system provided between rear portion of a vehicular body at the same transverse side to the second actuator and a fourth road wheel, the fourth actuator being variable of fluid pressure so as to adjust a relative distance between the vehicular body and the fourth road wheel an anti-pitching control means monitoring magnitude of vehicular pitching, comparing the monitored pitching magnitude with a target pitching magnitude for producing pitching control signals for adjusting fluid pressure in respective of the first, second, third and fourth actuators so as to reduce a difference between the monitored pitching magnitude and the target pitching magnitude to zero, which pitching control signals for adjusting fluid pressures of the first and second actuators having opposite polarity to that for adjusting fluid pressure of the third and fourth actuator an anti-rolling control means monitoring magnitude of vehicular rolling, comparing the monitored rolling magnitude with a target rolling magnitude for producing rolling control signals for adjusting fluid pressure in respective of the first, second, third and fourth actuators for reducing a difference between the monitored rolling magnitude and the target rolling magnitude to zero, which rolling control signals for adjusting fluid pressures of the first and third actuators having opposite polarity to that for adjusting fluid pressure of the second and fourth actuator and a lifting control means monitoring lifting magnitude at respective of the first, second, third and fourth suspension systems, comparing the monitored lifting magnitude at each of the first, second, third and fourth suspension systems with a target lifting magnitude, and deriving a lifting control signal on the basis of the difference so that the difference at each of the suspension systems is reduced to zero.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
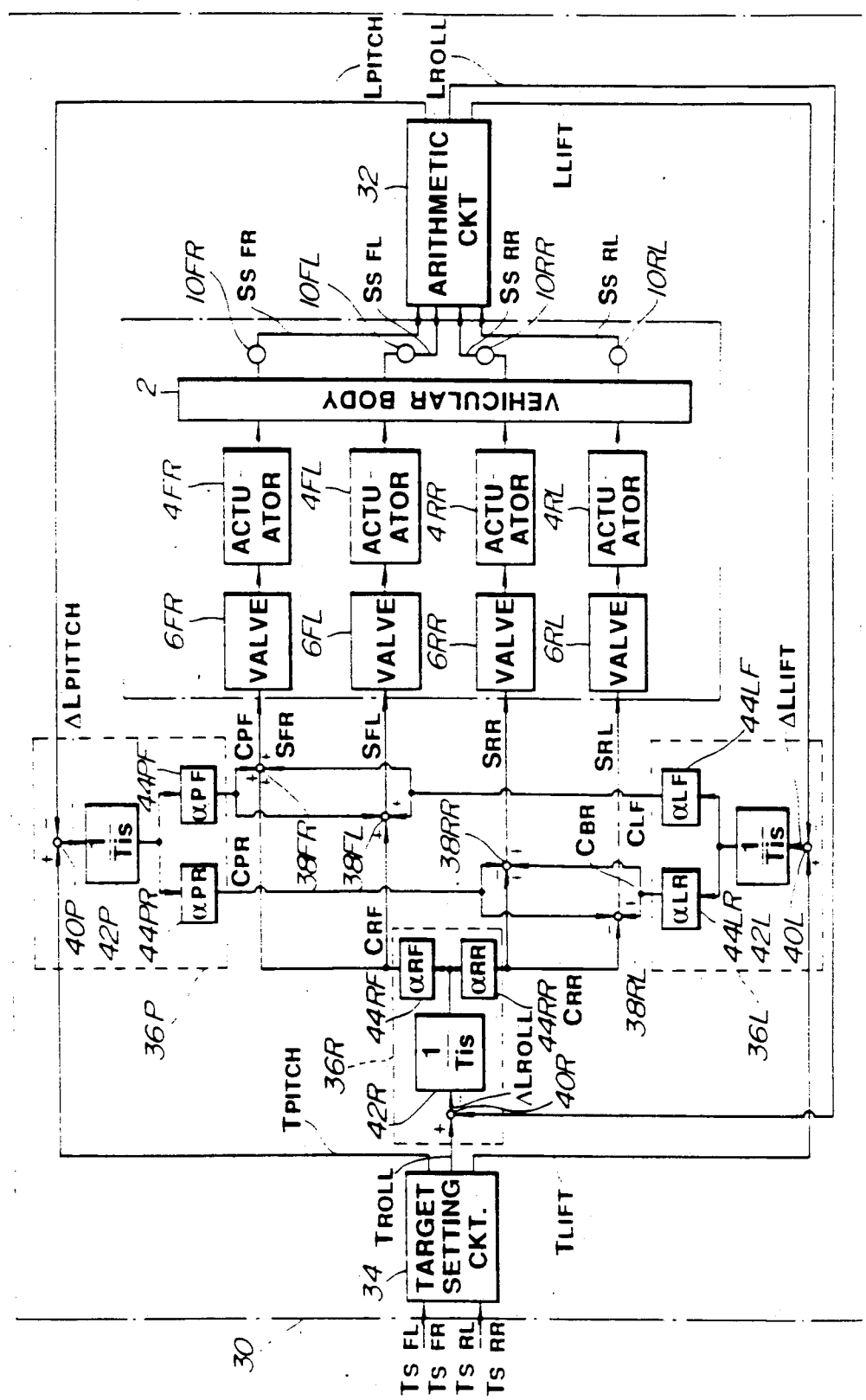
FIG. 1 is a block diagram of the preferred embodiment of a vehicular height regulation system according to the invention.

Referring now to the drawings, particularly to FIG. 1, the preferred embodiment of a vehicular height regulation system, according to the present invention, includes fluid actuators 4FL, 4FR, 4RL and 4RR respectively associated with front-left, front-right, rear-left and rear-right suspension systems which are disposed between a vehicular body 2 and road wheels. Each actuator may comprise a hydraulic actuator, pneumatic actuator or hydropneumatic actuator and so forth, and typically comprises pneumatic actuator associated with shock absorber for defining a pneumatic chamber connected to a pneumatic pressure source, typically a pressurized air source, for example.

The actuators 4FL, 4FR, 4RL and 4RR are connected to a pressurized fluid source via pressure control valves 6FL, 6FR, 6RL and 6RR. The pressure control valves 6FL, 6FR, 6RL and 6RR are connected to a control unit 30 for varying valve position according to pressure control signals from the latter for adjusting the fluid pressure in the actuators 4FL, 4FR, 4RL and 4RR. In order to monitor the relative distance between the vehicular body 2 and the road wheels at respective front-left, front-right, rear-left and rear-right suspension systems, stroke sensors 10FL, 10FR, 10RL and 10RR are provided for respective suspension systems. The stroke sensors 10FL, 10FR, 10RL and 10RR are designed for monitoring strokes of relative displacement at respective front-left, front-right, rear-left and rear-right suspension systems and producing respective front-left, front-right, rear-left and rear-right stroke indicative signals $Ss_{FL}$, $Ss_{FR}$, $Ss_{RL}$ and $Ss_{RR}$.

The control unit 30 has an arithmetic circuit 32 which receives the front-left, front-right, rear-left and rear-right stroke indicative signals $Ss_{FL}$, $Ss_{FR}$, $Ss_{RL}$ and $Ss_{RR}$ and deriving magnitude of attitude change of the vehicular body 2. In the shown embodiment, the arithmetic circuit 32 is so designed as to derive vehicular body pitching magnitude, rolling magnitude and lifting magnitude. Respective of the pitching magnitude $L_{PITCH}$, rolling magnitude $L_{ROLL}$ and lifting magnitude $L_{LIFT}$ are derived through the following equations:

$$L_{PITCH} = \{(Ss_{FL} + Ss_{FR})/2\} - \{(Ss_{RL} + Ss_{RR})/2\}$$

$$L_{ROLL} = \{(Ss_{FR} + Ss_{RR})/2\} - \{(Ss_{FL}Ss_{RL})/2\}$$

$$L_{LIFT} = (Ss_{FL} + Ss_{FR} + Ss_{RL} + Ss_{RR})/4$$

The control unit 30 also has a target setting circuit 34, for which target strokes $Ts_{FL}$, $Ts_{FR}$, $Ts_{RL}$ and $Tr_{RR}$ of respective front-left, front-right, rear-left and rear-right suspension systems are set. The target setting circuit 34 is designed for arithmetically deriving target pitching magnitude $T_{PITCH}$, target rolling magnitude $T_{ROLL}$ and target lifting magnitude $T_{LIFT}$. The target pitching magnitude indicative signal $T_{PITCH}$ is fed an adder 40P which is, in turn connected to a pitching control circuit 36P. Similarly, the target setting circuit 34 outputs the target rolling magnitude indicative signal $T_{ROLL}$ to an adder 40R which is, in turn, connected to a rolling control circuit 36R. The target setting circuit 34 is further connected to an adder 40L to feed the target lifting magnitude indicative signal $T_{LIFT}$, which adder is, in turn, connected to a lifting control circuit 36L. The adders 40P, 40R and 40L also receive the pitching magnitude indicative signal $L_{PITCH}$, the rolling magnitude indicative signal $L_{ROLL}$ and the lifting magnitude indicative signal $L_{LIFT}$ respectively in order to deriving differences $\Delta L_{PITCH}$, $\Delta L_{ROLL}$ and $\Delta L_{LIFT}$. The adders 40P, 40R and 40L output the difference indicative signals $\Delta L_{PITCH}$, $\Delta L_{ROLL}$ and $\Delta L_{LIFT}$ to integrator circuits 42P, 42R and 42L. Respectively of the integrator circuits 42P, 42R and 42L are provided transfer function G $\{=1/(Ti \times S)\}$ (where Ti: integration period, S: stroke difference as derived through the adders 40P, 40R and 40L $S_P$, $S_R$ and S). Therefore, respective integrator circuits 42P, 42R, 42L performs operation for deriving difference dependent demand pressure values $P_{DM}$, $R_{DM}$ and $L_{DM}$ on the basis of the difference indicative signals $\Delta L_{PITCH}$, $\Delta L_{ROLL}$ and $\Delta L_{LIFT}$ and the transfer function G. The integrator circuit 42P is connected to coefficient circuits 44PF and 44PR respectively provided coefficients $\alpha_{PF}$ and $\alpha_{PR}$. The coefficient circuits 44PF and 44PR thus derives front and rear pitching control signals $C_{PF}$ and $C_{PR}$ by multiplying the difference dependent demand pressure value $P_{DM}$ with respective coefficients $\alpha_{PF}$ and $\alpha_{PR}$. Similarly, the integrator circuit 42R is connected to coefficient circuits 44RF and 44RR. The coefficient circuits 44RF and 44RR are provided coefficients $\alpha_{PF}$ and $\alpha_{PR}$ similarly to the coefficient circuits 44RF and 44RR. These coefficient circuits 44RF and 44RR multiplies the difference dependent demand pressure value $R_{DM}$ with the coefficients $\alpha_{PF}$ and $\alpha_{PR}$ to derive front and rear rolling control signals $C_{RF}$ and $C_{RR}$. Also, the integrator circuit 42L is connected to coefficient circuits 44LF and 44LR. The coefficient circuits 44LF and 44LR are provided coefficients $\alpha_{PF}$ and $\alpha_{PR}$ similarly to the coefficient circuits 44LF and 44LR. These coefficient circuits 44LF and 44LR multiplies the difference dependent demand pressure value $L_{DM}$ with the coefficients $\alpha_{PF}$ and $\alpha_{PR}$ to derive front and rear lift control signals $C_{LF}$ and $C_{LR}$.

Three terminal adders 38FL, 38FR, 38RL and 38RR are provided in the control unit 30. The adder 38FL has inverting input terminal connected to the coefficient circuit 44PF of the rolling control circuit 36R. Also, the adder 38FL has another two non-inverting terminals connected to the coefficient circuits 44PF and 44LF. Therefore, the adder 38FL adds the front pitching control signal $C_{PF}$ and the front lift control signal $C_{LF}$ and subtract therefrom the rolling control signal $C_{RF}$ for deriving a front-left stroke control signal $S_{FL}$. The adder 38FR has three non-inverting terminals respectively connected to the coefficient circuits 44PF, 44RF and 44LF for deriving sum of the pitching control signal $C_{PF}$, $C_{RF}$ and $C_{LF}$ for deriving the front-right stroke control signal $S_{FR}$. The adder 38RR has an inverting terminal connected to the coefficient circuit 44PR of the pitching control circuit 36P and another two non-inverting terminals connected to the coefficient circuits 44RR and 44LR. Therefore, the adder 33RR derives sum of the rear rolling control signal $C_{RR}$ and the rear lifting control signal $C_{LR}$ and subtract therefrom the rear pitching control signal $C_{PR}$ for deriving the rear-right stroke control signal $S_{RR}$. Furthermore, the adder 38RL has two inverting terminals connected to the coefficient circuits 44P and 44R for receiving inverted rear pitching control signal $C_{PR}$ and rear rolling control signal $C_{RR}$ and have a non-inverting terminal connected to the coefficient circuit 44LR. Therefore, the adder 38RL subtracts the rear pitching control signal $C_{PR}$ and the rear rolling control signal $C_{RR}$ from the rear lifting control signal $C_{LR}$ for deriving the rear-left stroke control signal $S_{RL}$.

Here, assuming heavy load, such as luggage, is loaded on the right-side of the vehicle to cause lowering the vehicular height to the right-side of the vehicle, and assuming the target rolling magnitude indicative signal $T_{ROLL}$ set through the target setting circuit 34 is zero (0), the rolling magnitude $L_{ROLL}$ derived by the arithmetic circuit 32 is compared with the target rolling magnitude $T_{ROLL}$ in the adder 40R of the rolling control circuit 36R. The adder 40R thus derives the difference $\Delta L_{ROLL}$. At this time, since the vehicular body rolls to lower the right side. Therefore, the value of the rolling magnitude indicative signal $L_{ROLL}$ becomes negative. As a result, the difference $\Delta L_{ROLL}$ derived in the adder 40R becomes positive value, value of which is variable depending upon the magnitude of vehicular rolling. The difference $\Delta L_{ROLL}$ as the output of the adder 40R is integrated by the integrator circuit 42R. The integrator 42R thus output the difference dependent demand pressure value $R_{DM}$. The output $R_{DM}$ of the integrator circuit 42R is multiplied by coefficients $\alpha_{RF}$ and $\alpha_{RR}$ by the coefficient circuits 44RF and 44RR. The coefficient circuits 44RF and 44RR thus output the front and rear rolling control signals $C_{RF}$ and $C_{RR}$. These front and rear rolling control signals $C_{RF}$ and $C_{RR}$ are fed to the adders 38FL, 38FR, 38RL and 38RR. In the adders 38FL, 38FR, 38RL and 38RR, the front and rear rolling control signals $C_{RF}$ and $C_{RR}$ are combined with the front and rear pitching control signals $C_{PF}$ and $C_{PR}$ and the front and rear lifting control signals $C_{LF}$ and $C_{LR}$. The adders 38FL, 38FR, 38RL and 38RR thus output the stroke control signals $S_{FL}$, $S_{FR}$, $S_{RL}$ and $S_{RR}$.

Here, assuming vehicular pitching and lifting is ignored, anti-rolling control can be performed by supplying the stroke control signals $S_{FL}$, $S_{FR}$, $S_{RL}$ and $S_{RR}$ containing the rolling control signals $C_{RF}$ and $C_{RR}$, to the front-left, front-right, rear-left and rear right pressure control valves 6FL, 6FR, 6RL and 6RR. Since the positive values of front and rear rolling control signals $C_{RF}$ and $C_{RR}$ are supplied to the inverting terminal of the adders 38FL and 38RL and to the non-inverting terminal of the adders 38FR and 38RR. Therefore, the stroke control signals $S_{FL}$ and $S_{RL}$ becomes negative to operate the front-left and rear-left pressure control valves 6FL and 6RL for reducing the fluid pressure in the front-left and rear-left actuators 4FL and 4RL. On the other hand, since the stroke control signals $S_{FR}$ and $S_{RR}$ for the front-right and rear-right pressure control valves 6FR and 6RR are positive, these pressure control valves are operated to increase the fluid pressure in the front-right and rear-right actuators 4FR and 4RR. By this the vehicular rolling magnitude can be reduced. Since the integrator circuit 42R continues output of the difference indicative signal $\Delta L_{ROLL}$ until the difference between the rolling magnitude indicative signal value $L_{ROLL}$ and the target rolling magnitude $T_{ROLL}$ becomes zero. Therefore, the rolling magnitude can be suppressed at the target rolling magnitude.

With the shown construction, since the coefficient circuits 44RF and 44RR are set the coefficients $\alpha_{RF}$ and $\alpha_{RR}$ for adjusting distribution of load, it becomes possible to obtain optimal load distribution by appropriately setting the coefficients $\alpha_{RF}$ and $\alpha_{RR}$. For instance, when the coefficients $\alpha_{RF}$ and $\alpha_{RR}$ are set at the equal value to each other, even rate load distribution can be obtained. This eliminate difference of wheel load between the front and rear wheels and thus eliminate influence for the vehicular cornering characteristics. Furthermore, with the shown construction, steering characteristics in left-hand steering and right-hand steering becomes even for providing improved drivability of the vehicle.

Similar control is performed in response to vehicular pitching or lifting. Namely, in case of anti-pitching control, since the front pitching control signal $C_{PF}$ is supplied to the non-inverting terminals of the adders 38FL and 38FR and the rear pitching control signal $C_{PR}$ is supplied to the inverting terminal of the adders 38RL and 38RR. Polarities of the stroke control signals $S_{FL}$, $S_{FR}$ and $S_{RL}$, $S_{RR}$ become opposite. For instance, when load is applied to lower the rear side of the vehicular body to cause pitching, the value of the difference indicative signal $\Delta L_{PITCH}$ becomes negative. Therefore, the fluid pressure in the front-left and front-right actuators 4FL and 4FR is decreased and the fluid pressure in the rear-left and rear-right actuators 4RL and 4RR is increased to decrease magnitude of vehicular pitching.

Lifting control is performed when the level of the overall vehicular body is lowered. In the lifting control, magnitude of lowering of the vehicular body is derived by arithmetic circuit 32L of the lifting control circuit 36L. The lifting magnitude indicative signal $L_{LIFT}$ output from the arithmetic circuit 32L is compared with the target lifting magnitude $T_{LIFT}$ in the adder 40L. Since the vehicular body is lowered, positive value of the difference indicative signal $\Delta L_{LIFT}$ is output from the adder 40L. Therefore, positive value of the stroke control signals $S_{FL}$, $S_{FR}$, $S_{RL}$ and $S_{RR}$ are output from respective adders 38FL, 38FR, 38RL and 38RR for increasing the fluid pressure in respective actuators 4FL, 4FR, 4RL and 4RR. Therefore, the vehicular height level is maintained at a regular level.

In the anti-pitching control and lifting control, the coefficients $\alpha_{PF}$, $\alpha_{PR}$ and $\alpha_{LF}$, $\alpha_{LR}$ can be set independently of each other. However, it is preferred to set these coefficients $\alpha_{PF}$, $\alpha_{PR}$ and $\alpha_{LF}$, $\alpha_{LR}$ so that anti-pitching control and lifting control may not interfere to each other.

In the practical control, anti-rolling control signal, anti-pitching control signal and lifting control signal are input to the adder for deriving the stroke control signal. Therefore, the stroke control signal is derived with including the anti-rolling component, anti-pitching component and lift control component. Since the vehicular body behaviour or attitude change is generally caused in rolling, pitching and lifting, the stroke control signal derived with including all of the anti-rolling component, anti-pitching component and lift control component will be effective for stabilizing the vehicular body attitude.

It should be appreciated though the shown embodiment solely employs an integration circuits in respective of the anti-rolling control circuit 36R, anti-pitching control circuit 36P and the lifting control circuit 36L, an ON/OFF switching element for selectively performing anti-rolling control, anti-pitching control and the lifting control can also be employed in the control circuits. Furthermore, it may be possible to further include a proportional element in parallel to the integration circuit for establishing PI control. In such case, the presence of the proportional element will prevent the control from causing hunting or cycling and thus will provide stability in suspension control.

Figure 2:
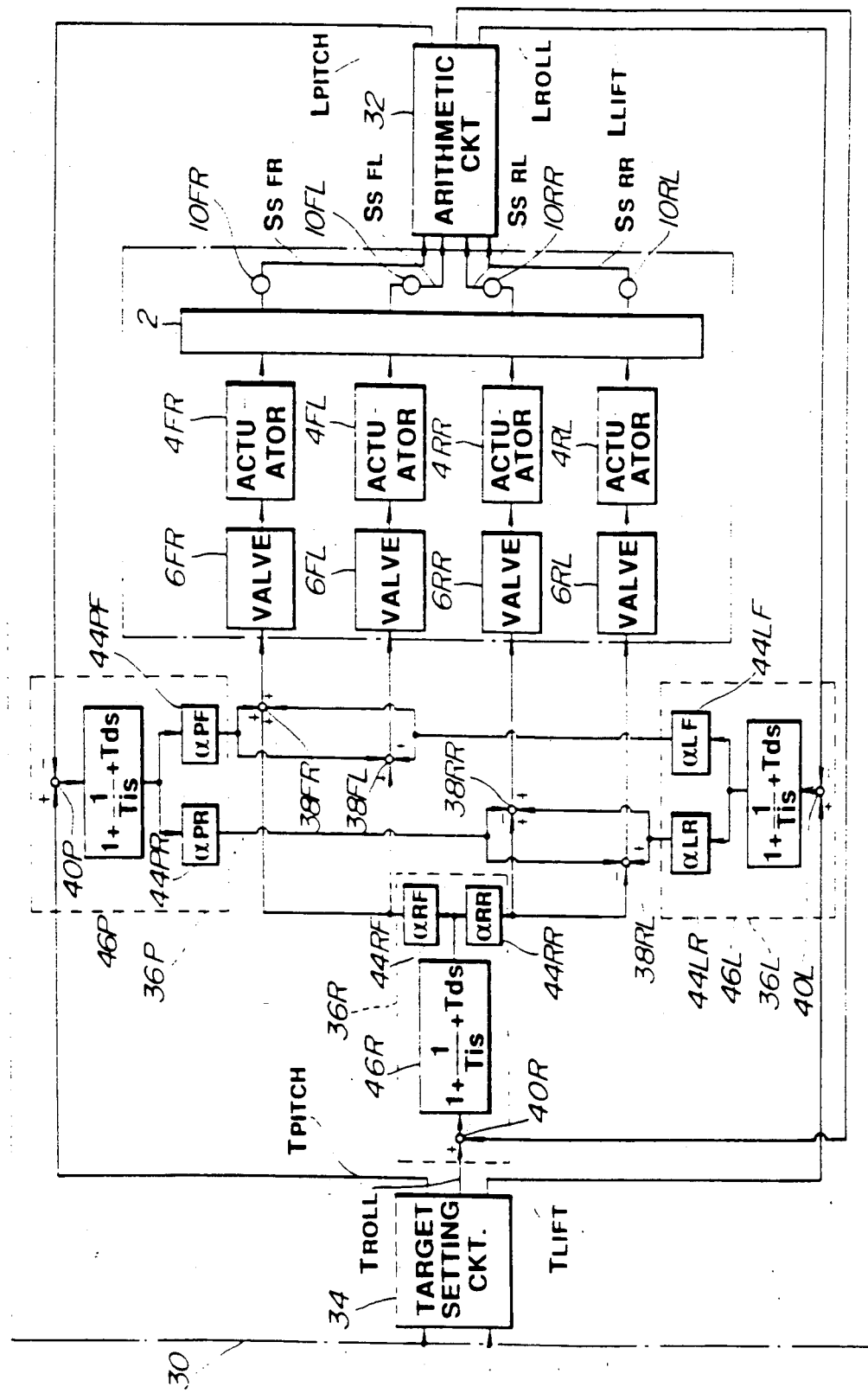
FIG. 2 is a block diagram of a modification of the preferred embodiment of the vehicular height regulation system of FIG. 1.

FIG. 2 shows the second embodiment of the vehicular height regulation system according to the present invention. As will be seen from FIG. 1, the shown system incorporates modification from the system of FIG. 1. In this embodiment, the integrator circuits 42R, 42P and 42L of the anti-rolling control circuit 36R, the anti-pitching control circuit 38P and the lifting control circuit 38L are replaced with integrator circuits 46R, 46P and 46L. These integrator circuits 46R, 46P and 46L are provided transfer function G $\{=1+1/(Ti \times S)+Td \times S\}$ (Td: differentiation period), which is different from that of the integrator circuit in the former embodiment. As can be seen herefrom, the transfer function provided for the integrator circuit 46R, 46P and 46L includes proportional element, integration element and differentiation element. This embodiment provides equivalent vehicular attitude stabilization performance with maintaining satisfactorily high cornering stability. In addition, in the shown embodiment, higher response characteristics and higher stability in height control can be obtained. Furthermore, in the transfer function, the proportional element serves for adjusting pitching resistance, rolling resistance and lifting resistance and the differentiation element serves for adjusting damping characteristics against rolling, pitching and lifting. Therefore, the actuator may perform equivalent function to the suspension coil spring, suspension damper and stabilizer. Therefore, if desired, these coil spring, damper and/or stabilizer can be removed from the vehicular suspension system for simplification of the construction of the suspension system.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the foregoing embodiments employs four stroke sensors for monitoring vehicular height level at positions of respective suspension systems, it may be possible to perform three sensors respectively monitoring front-left, front-right and rear average height levels. In such case, the vehicular pitching magnitude may be derived as a difference of the average value of the sensor signals of front-left and front-right sensors and the sensor signal value of the rear sensor. The rolling magnitude is derived by a difference of the sensor signals of the front-left and front-right sensors. The lifting magnitude is derived as average value of the sensor signals of the three sensors.

What is claimed is:

1. A vehicular height regulation system comprising:
a first fluid actuator provided in a first suspension system disposed between a first side of a vehicular body and a first road wheel, said first actuator being variable of fluid pressure for adjusting relative distance between said first side of the vehicular body and said first road wheel;
a second fluid actuator provided in a second suspension system disposed between a second side of the vehicular body opposite to said first side and a second road wheel, said second fluid actuator being variable of fluid pressure for adjusting relative distance between said second side of the vehicular body and said second road wheel;
a fluid pressure source circuit connected to said first and second actuators, said fluid pressure source circuit incorporating a first valve means for adjusting fluid pressure in said first fluid actuator and a second valve means for adjusting fluid pressure in said second fluid actuator;
a sensor means for monitoring a preselected parameter affected by vehicular attitude and variable depending upon magnitude and direction of vehicular body attitude change for producing an attitude change representative signal;
means for processing said attitude change representative signal for deriving vehicular body attitude change representative data;
a target attitude change magnitude setting means for setting a target attitude change magnitude and generating reference data representative of said target attitude change magnitude;
means for comparing said vehicular attitude change representative data and said reference data for deriving difference data representative of a difference therebetween; and
a controlling means, responsive to said difference data, for deriving first and second control signals which have opposite polarity to each other, for controlling said first and second valve means for reducing the difference between said vehicular attitude change representative data and said reference data to zero.

2. A vehicular height regulation system as set forth in claim 1, wherein said controlling means has first and second coefficient circuits respectively providing first and second coefficients determining response characteristics of fluid pressure control for said first and second fluid actuators, and said controlling means derives said first and second control signals on the basis of said difference data and said first and second coefficients.

3. A vehicular height regulation system as set forth in claim 2, wherein said controlling means further comprises a function circuit providing a transfer function including at least an integral element, said function circuit processing said difference data with said transfer function for generating a processed difference data, and said first and second coefficient circuits derive said first and second control signals on the basis of said processed difference data and said first and second coefficients.

4. A vehicular height regulation system as set forth in claim 1, wherein said sensor means comprises a first stroke sensor monitoring relative distance between said first side of the vehicular body and said first road wheel for producing a first stroke indicative signal as a first attitude change representative signal and a second stroke sensor monitoring relative distance between said first side of the vehicular body and said second road wheel for producing a second stroke indicative signal as a second attitude change representative signal, and said attitude change representative signal processing means derives said attitude change representative data on the basis of said first and second strike indicative signals.

5. A vehicular height regulation system as set forth in claim 4, wherein said target attitude change magnitude setting means sets a first target stroke between said first side of said vehicular body and said first road wheel and a second target stroke between said second side of said vehicular body and said second road wheel, and said target attitude change magnitude setting means derives said target attitude change magnitude on the basis of said first and second target strokes.

6. An anti-rolling control system for a vehicular height regulation system comprising:
- a first fluid actuator provided in a first suspension system disposed between a first side of a vehicular body and a first road wheel, said first actuator being variable of fluid pressure for adjusting relative distance between said first side of the vehicular body and said first road wheel;
- a second fluid actuator provided in a second suspension system disposed between a second side of the vehicular body transversely oriented opposite to said first side and a second road wheel, said second fluid actuator being variable of fluid pressure for adjusting relative distance between said second side of the vehicular body and said second road wheel;
- a fluid pressure source circuit connected to said first and second actuators, said fluid pressure source circuit incorporating a first valve means for adjusting fluid pressure in said first fluid actuator and a second valve means for adjusting fluid pressure in said second fluid actuator;
- a sensor means for monitoring a preselected parameter affected by vehicular attitude and variable depending upon magnitude and direction of vehicular body rolling for producing a rolling representative signal;
- means for processing said rolling representative signal for deriving vehicular rolling representative data;
- a target rolling magnitude setting means for setting a target rolling magnitude and generating reference data representative of said target rolling magnitude;
- means for comparing said vehicular rolling representative data and said reference data for deriving difference data representative of a difference therebetween; and
- a controlling means, responsive to said difference data, for deriving first and second control signals which have opposite polarity to each other, for controlling said first and second valve means for reducing the difference between said vehicular rolling representative data and said reference data to zero.

7. A vehicular height regulation system as set forth in claim 6, wherein said controlling means has first and second coefficient circuits respectively providing first and second coefficients determining response characteristics of fluid pressure control for said first and second fluid actuators, and said controlling means derives said first and second control signals on the basis of said difference data and said first and second coefficients.

8. A vehicular height regulation system as set forth in claim 7, wherein said controlling means further comprises a function circuit providing a transfer function including at least an integral element, said function circuit processing said difference data with said transfer function for generating a processed difference data, and said first and second coefficient circuits derive said first and second control signals on the basis of said processed difference data and said first and second coefficients.

9. A vehicular height regulation system as set forth in claim 6, wherein said sensor means comprises a first stroke sensor monitoring relative distance between said first side of the vehicular body and said first road wheel for producing a first stroke indicative signal as a first rolling representative signal and a second stroke sensor monitoring relative distance between said first side of the vehicular body and said second road wheel for producing a second stroke indicative signal as a second rolling representative signal, and said rolling representative signal processing means derives said rolling representative data on the basis of said first and second strike indicative signals.

10. A vehicular height regulation system as set forth in claim 9, wherein said target rolling magnitude setting means sets a first target stroke between said first side of said vehicular body and said first road wheel and a second target stroke between said second side of said vehicular body and said second road wheel, and said target rolling magnitude setting means derives said target rolling magnitude on the basis of said first and second target strokes.

11. An anti-pitching control system for a vehicular height regulation system comprising:
- a first fluid actuator provided in a first suspension system disposed between a first side of a vehicular body and a first road wheel, said first actuator being variable of fluid pressure for adjusting relative distance between said first side of the vehicular body and said first road wheel;
- a second fluid actuator provided in a second suspension system disposed between a second side of the vehicular body transversely oriented opposite to said first side and a second road wheel, said second fluid actuator being variable of fluid pressure for adjusting relative distance between said second side of the vehicular body and said second road wheel;
- a fluid pressure source circuit connected to said first and second actuators, said fluid pressure source circuit incorporating a first valve means for adjusting fluid pressure in said first fluid actuator and a second valve means for adjusting fluid pressure in said second fluid actuator;
- a sensor means for monitoring a preselected parameter affected by vehicular attitude and variable depending upon magnitude and direction of vehicular body pitching for producing a pitching representative signal;
- means for processing said pitching representative signal for deriving vehicular pitching representative data;
- a target pitching magnitude setting means for setting a target pitching magnitude and generating reference data representative of said target pitching magnitude;
- means for comparing said vehicular pitching representative data and said reference data for deriving difference data representative of a difference therebetween; and
- a controlling means, responsive to said difference data, for deriving first and second control signals which have opposite polarity to each other, for controlling said first and second valve means for reducing the difference between said vehicular pitching representative data and said reference data to zero.

12. A vehicular height regulation system as set forth in claim 11, wherein said controlling means has first and second coefficient circuits respectively providing first and second coefficients determining response characteristics of fluid pressure control for said first and second fluid actuators, and said controlling means derives said first and second control signals on the basis of said difference data and said first and second coefficients.

13. A vehicular height regulation system as set forth in claim 12, wherein said controlling means further comprises a function circuit providing a transfer function including at least an integral element, said function circuit processing said difference data with said transfer function for generating a processed difference data, and said first and second coefficient circuits derive said first and second control signals on the basis of said processed difference data and said first and second coefficients.

14. A vehicular height regulation systems as set forth in claim 11, wherein said sensor means comprises a first stroke sensor monitoring relative distance between said first side of the vehicular body and said first road wheel for producing a first stroke indicative signal as a first pitching representative signal and a second stroke sensor monitoring relative distance between said first side of the vehicular body and said second road wheel for producing a second stroke indicative signal as a second pitching representative signal, and said pitching representative signal processing means derives said pitching representative data on the basis of said first and second strike indicative signals.

15. A vehicular height regulation system as set forth in claim 14, wherein said target pitching magnitude setting means sets a first target stroke between said first side of said vehicular body and said first road wheel and a second target stroke between said second side of said vehicular body and said second road wheel, and said target pitching magnitude setting means derives said target pitching magnitude on the basis of said first and second target strokes.

16. An attitude change suppressive vehicular height regulation system comprising:
a first actuator disposed in a first suspension system provided between a front portion of a vehicular body and a first road wheel, said first actuator being variable of fluid pressure so as to adjust a relative distance between said vehicular body and said first road wheel;
a second actuator disposed in a second suspension system provided between the front portion of the vehicular body and a second road wheel, said second actuator being variable of fluid pressure so as to adjust a relative distance between said vehicular body and said second road wheel;
a third actuator disposed in a third suspension system provided between a rear portion of a vehicular body at a transverse side to said first actuator and a third road wheel, said third actuator being variable of fluid pressure so as to adjust a relative distance between said vehicular body and said third road wheel;
a fourth actuator disposed in a fourth suspension system provided between the rear portion of the vehicular body at the same transverse side to said second actuator and a fourth road wheel, said fourth actuator being variable of fluid pressure so as to adjust a relative distance between said vehicular body and said fourth road wheel;
an anti-pitching control means monitoring a magnitude of vehicular pitching, comparing the monitored pitching magnitude with a target pitching magnitude for producing pitching control signals for adjusting fluid pressure in respective ones of said first, second, third and fourth actuators so as to reduce to zero a difference between the monitored pitching magnitude and said target pitching magnitude, wherein pitching control signals for adjusting fluid pressures of said first and second actuators have opposite polarity to that of pitching control signals for adjusting fluid pressure of said third and fourth actuators;
an anti-rolling control means monitoring a magnitude of vehicular rolling, comparing the monitored rolling magnitude with a target rolling magnitude for producing rolling control signals for adjusting fluid pressure in respective ones of said first, second, third and fourth actuators for reducing to zero a difference between the monitored rolling magnitude and said target rolling magnitude, wherein rolling control signals for adjusting fluid pressures of said first and third actuators have opposite polarity to that of rolling control signals for adjusting fluid pressure of said second and fourth actuators; and
a lifting control means monitoring a lifting magnitude at respective ones of said first, second, third and fourth suspension systems, comparing the monitored lifting magnitude at each of said first, second, third and fourth suspension systems with a target lifting magnitude and obtaining a difference therebetween, and deriving a lifting control signal on the basis of said difference so that said difference at each of said suspension systems is reduced to zero.

17. A vehicular height regulation system as set forth in claim 16, which further comprises first, second, third and fourth stroke sensors respectively associated with said first, second, third and fourth suspension systems for monitoring a relative distance between the vehicular body and an associated one of said first, second, third and fourth road wheels, and wherein said stroke sensors provide attitude indicative data for enabling said anti-pitching control means, said anti-rolling control means and said lifting control means to derive said pitching, rolling and lifting magnitudes.

18. A vehicular height regulation system as set forth in claim 16, which further comprises first and second stroke sensors respectively associated with said first and second suspension systems for monitoring a relative distance between the vehicular body and an associated one of said first and second road wheels, and a third stroke sensor for monitoring an average relative distance between the vehicular body and said third and fourth road wheels, said stroke sensors providing attitude indicative data for enabling said anti-pitching control means, said anti-rolling control means and said lifting control means to derive said pitching, rolling and lifting magnitudes.

19. A vehicular height regulation system as set forth in claim 16, wherein said lifting control means sets said target lifting magnitude for each of said suspension systems, and said anti-pitching and said anti-rolling control means derive said target pitching magnitude and said target rolling magnitude on the basis of said target lifting magnitudes.

20. A vehicular height regulation system as set forth in claim 16, wherein each of said anti-pitching, said anti-rolling and said lifting control means has a transfer function including at least an integral element, and processes said difference with said transfer function for deriving said control signal.

21. A vehicular height regulation system as set forth in claim 16, wherein each of said anti-pitching, said anti-rolling and said lifting control means has a transfer function including at least a differentiation element, and processes said difference with said transfer function for deriving said control signal.

22. A vehicular height regulation system as set forth in claim 16, wherein each of said anti-pitching, said anti-rolling and said lifting control means has a transfer function including at least a proportional element, and processes said difference with said transfer function for deriving said control signal.

23. A vehicular height regulation system as set forth in claim 16, wherein each of said anti-pitching, said anti-rolling and said lifting control means has a transfer function including an integral element, a differentiation element and a proportional element, and processes said difference with said transfer function for deriving said control signal.

24. A vehicular height regulation system as set forth in claim 23, wherein said transfer function further includes an ON/OFF element.

25. A vehicular height regulation system as set forth in claim 16, wherein each of said anti-pitching, said anti-rolling and said lifting control means has a control gain which can be set with respect to each of said first, second, third and fourth suspension systems independently of each other.

* * * * *